Nov. 19, 1968    A. J. PFEUFFER    3,411,466
SCARFING TORCH

Filed Oct. 25, 1966    3 Sheets-Sheet 1

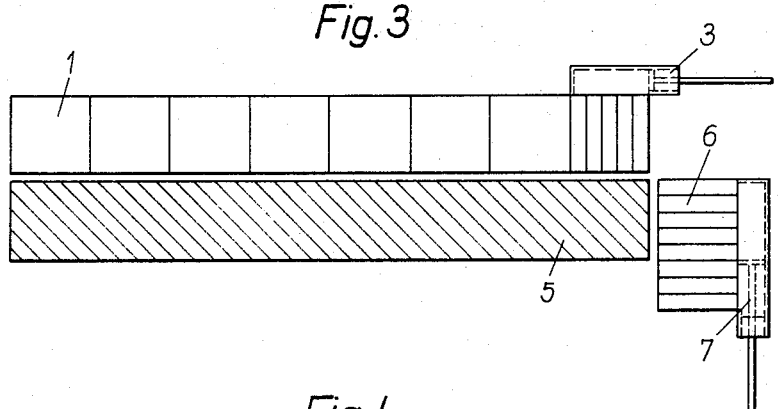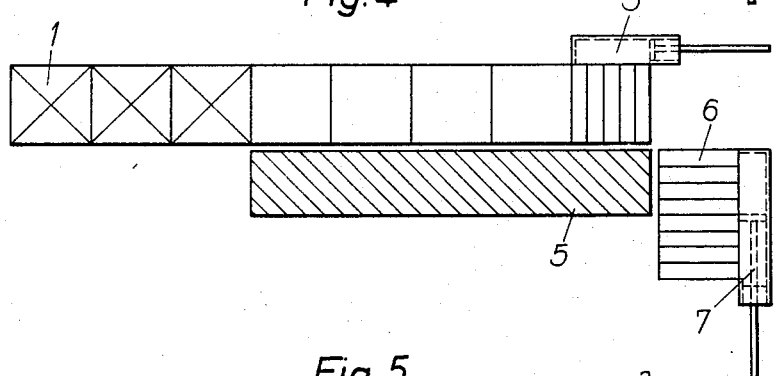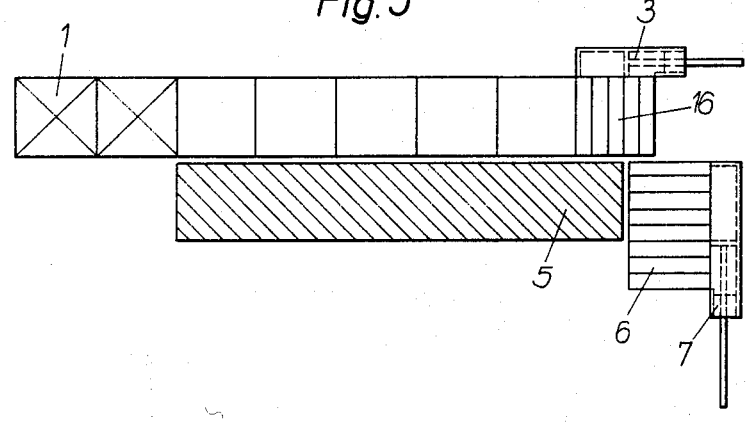

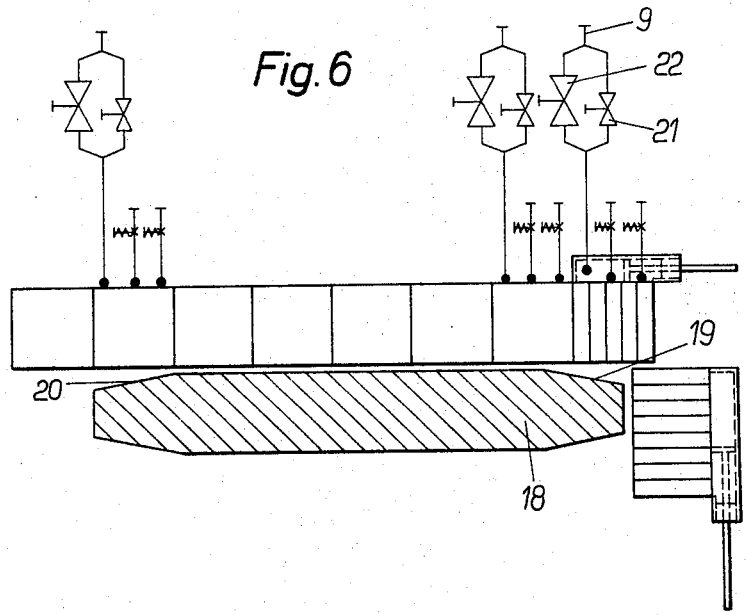
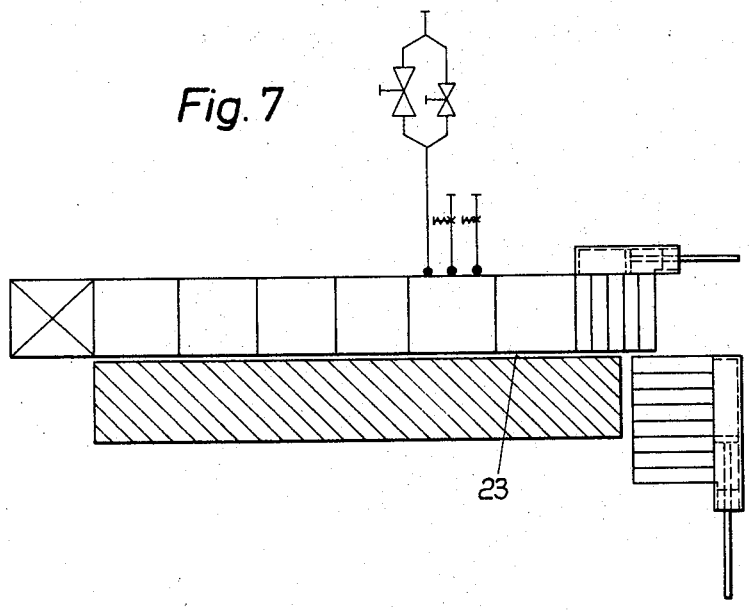

United States Patent Office 3,411,466
Patented Nov. 19, 1968

3,411,466
SCARFING TORCH
Alfred J. Pfeuffer, Neu Isenburg, Germany, assignor to Messer Griesheim GmbH., Frankfurt am Main, Germany, a corporation of Germany
Filed Oct. 25, 1966, Ser. No. 589,417
Claims priority, application Germany, Oct. 30, 1965, M 67,127
8 Claims. (Cl. 110—22)

ABSTRACT OF THE DISCLOSURE

A scarfing torch includes a number of side by side scarfing heads which feed a flat wide stream of oxidizing gas therethrough against a workpiece surface. Additionally, the heads include a plurality of fuel gas and preheat passages which terminate adjacent the oxidizing gas passages and various control means for selectively opening and closing the passages of the outer head independently of the other heads.

---

The invention relates to a scarfing torch for thermochemical metal removal, particularly with the use of an auxiliary powder. Such torches and its scarfing heads are described in U.S. Patents 3,230,117 and 2,794,755 and in German Patents 921,924 and 947,849.

In scarfing torches the width of the scarfing heads normally corresponds to the widest portion of the surfaces to be processed. In order to be able to scarf narrower surfaces, adjustable valve arrangements are provided (U.S. Patent 3,224,748) to supply gas and powder only to those jet nozzles of the scarfing heads which are needed for the processing of that particular surface width, while the remaining nozzles of the scarfing head are closed or switched off from the gas conduit respectively powder conduit.

In order to be able to treat certain surface areas, separately, (for example areas having cracks, indentations or the like) it is necessary to change the scarfing oxygen pressure or the amount of scarfing oxygen in each respective area.

An object of this invention is to provide a scarfing torch which may effectively operate upon areas of varying width.

A further object of this invention is to provide a scarfing torch which may vary the depth of the metal removal about the width and the length of the surface.

In accordance with this invention the scarfing torch is divided into a number of separate scarfing heads, each individual head has conduits and passages for oxidizing gas, preheat fuel gas and for special purposes also for preheat oxygen gas and auxiliary powder and adjusting means, e.g., valves are arranged in said gas conduits for controlling the flow of said gases in each scarfing head separately and said gas adjusting means are connected with means for closing and opening said gas adjusting means in accordance with the physical characteristics of the workpiece and at least one of the outer scarfing heads includes control means, e.g., a known piston control for closing and opening the gas passages selectively. By means of this arrangement it is therefore possible to accomplish, in both a simple and advantageous manner, the crude adjustment of the preheat flames width and oxidizing gas width by shutting off separate scarfing heads and then accomplish the fine adjustment by the piston control.

To separately remove flaws on the surface, the torch may include a device for altering the oxidizing gas pressure or the amount of oxidizing gas.

For example, an increased oxidizing gas pressure is recommended in order to be able to scarf even beveled work piece edges, such as edges of ingots, with the same scarfing depth as such depth for the straight surfaces of the work piece.

The specific construction of such a device for adjusting the oxidizing gas pressure or oxidizing gas rate of flow can be varied to suit the given conditions. For example, the arrangement of an infinitely adjustable throttle valve would be feasible within the gas conduits of the scarfing heads, so that in a certain range an adjustment can be made of any desired oxidizing gas rate of flow. However, it is preferable, according to the invention, that in the oxidizing gas conduit of each scarfing head two valves are arranged parallel to each other, with one valve being designed for the normal use of oxygen and the other for an increased use thereof. The advantage of the latter embodiment consists in assuring a quick and secure switching from one oxygen amount to another. Of course, both valves can be constructed to be individually adjustable.

In order to be able to scarf not only the surface as well as the beveled edge surfaces of the work piece, but also at the same time the sides thereof, it is proposed in a further advantageous construction of the invention that for scarfing of the sides of the work piece at least one additional scarfing head be provided at the side whose channels can be closed and opened by a known piston control.

Both side surfaces can be scarfed in sequence. For example, this sequence can be a periodic turning of the work piece as required at certain intervals. Of course, it is also possible and is within the limits of the invention, to provide side scarfing heads at both sides of the work piece disposed toward each other and thus adjustable to the particular work piece width, so that both side surfaces can be treated in one work process in addition to scarfing the upper surface or separately.

In order to enable an adjustment of the side scarfing heads to different work piece widths the maximum gas discharge width of the additional heads is at least equal to the greatest possible width of the side surface of the work piece.

If the work piece thickness is less than the maximum discharge width of the side heads, the respective superfluous channels can be switched off or closed by the piston control.

Some kinds of metals and alloys are immune to or resist progressive oxidation by the conventional thermochemical metal removing action of only a preheating flame and a stream or jet of oxidizing gas like oxygen. With the use of auxiliary powders, e.g., mixtures of ferromanganese, iron, mild steel, an alloy of iron and tin, manganese metal, mixtures of manganese or ferromanganese with steel such immune metals can be scarfed. As it is known from U.S. Patent 2,622,048 the powder nozzles are generally mounted by a suitable arrangement directly on the scarfing head.

According to the invention the flow of powder out from said powder nozzles on each scarfing head is controlled by adjusting means separately, means for closing and opening said separate powder adjusting means are connected with them and control means are arranged for selectively closing and opening the passages to the powder nozzles on the outer scarfing heads.

By means of this arrangement the flow of auxiliary powder can be switched off simultaneously with the flow of the gases in each separate scarfing head. It is also possible to shut off only the powder flow in individual or in all scarfing heads. The individual shut-off of the powder flow can be used with immune steels only the flows on the surface and not the whole surface.

The embodiment of the invention is further illustrated by way of drawings wherein:

FIGS. 3–5 show the adjustment of the scarfing torch in scarfing work pieces of various width with FIG. 3 corresponding to FIG. 2;

FIG. 6 shows the scarfing of an ingot with sloping edge surface; and

FIG. 7 shows the scarfing of an ingot having a surface flaw.

Figure 1:
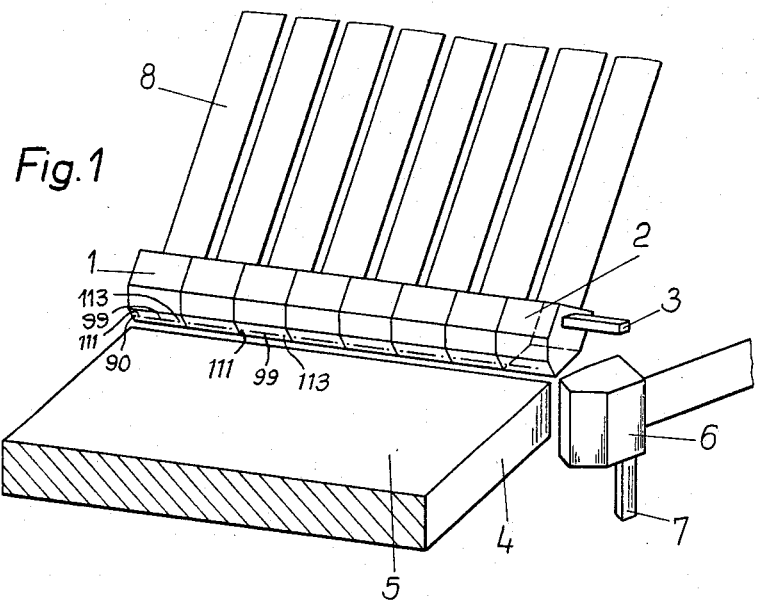
FIG. 1 shows a perspective design of a scarfing torch having a number of scarfing heads arranged side by side.
Figure 2:
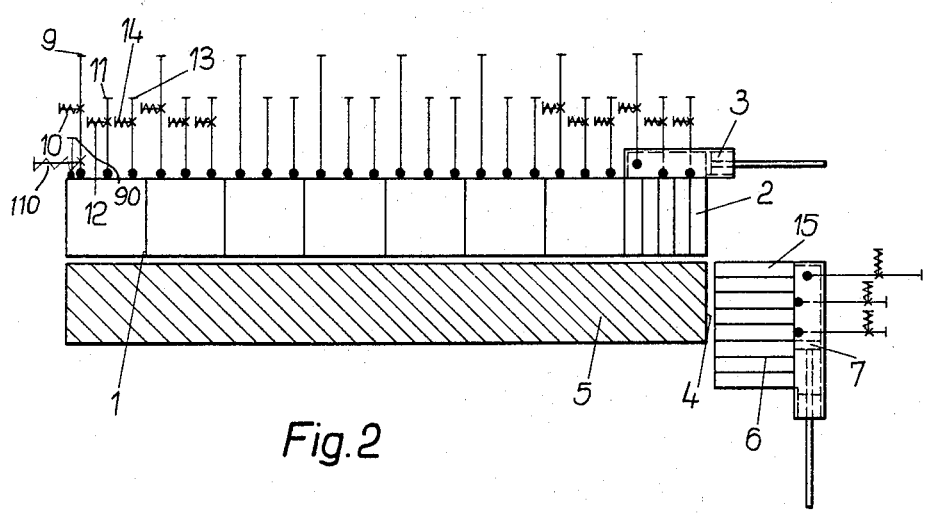
FIG. 2 shows a schematic design of the scarfing torch with its conduits for scarfing the upperside of the workpiece and a scarfing torch with only one head for scarfing simultaneously one side of the workpiece.

The scarfing torches shown in FIGS. 1–7 consist of eight scarfing heads 1 of which the edge head 2 has a piston control 3 for the continuous adjustment of the width of the gases. For scarfing of the side surface 4 of the work piece 5 a further torch with only one head 6 is provided which is also equipped with a piston control 7 for the width adjustment. Each head 1 has three conduits, which are schematically indicated in FIG. 2. Conduit 9 (which terminates in flat discharge opening 99) with magnetic valve 10 conducts the oxidizing gas, e.g., oxygen, conduit 11 (which terminates in orifice 110) with magnetic valve 12 conducts the preheat oxygen, and conduit 13 (which terminates in orifice 113) with magnetic valve 14 conducts the fuel gas.

The scarfing process can be practiced with internal and outside mixing of the gases for the preheat flame. In the case of internal mixing two separate conduits for fuel and oxygen strike in a mixer which can be arranged in the scarfing head or outside of the torch and the gas mixture is blown out from the nozzles. In case of outside mixing two conduits, one for fuel and the other for oxygen, runs to separate rows of nozzles which include an angle and fuel and gas is mixed outside the head. It is also possible that in case of outside mixing only a fuel conduit and fuel nozzles exist and the oxygen for the preheat flame is taken of from the oxidizing gas stream.

Therefore the number and arrangement of the conduits and valves depend on the kind of mixing the gases for the preheat flames. However, according to the invention all kinds of conduits arrangement in the separate heads can be closed and opened in the same manner.

If the work piece 5 has the same width as the scarfing torches 1 and 6, then all heads 1 and the edge head 2 are simultaneously used together in the same operation. However, if the side surface 4 of work piece 5 is not as wide as head 6, then, for instance, three of the channels 15 are switched off by the piston control 7, as shown in FIGS. 2 and 3.

The operation of piston control 7 is readily apparent from FIG. 2. The amount of extension or retraction of piston 7 determines the number of channels 15 which are opened. If the work piece 5 is narrower than the scarfing torch 1, having the width of five heads, for example, then the adjustment according to FIG. 4 takes place, where the first three heads are switched off.

FIG. 5 illustrates a condition where the width of the work piece is not as wide as the whole width of torch 1. Here the first two heads 1 are therefore shut off while the piston control 3 of the edge head 2 covers the superfluous channels. The piston control 3 thereby operates when the work piece width differs from the whole head width.

FIG. 6 shows an ingot 18 which is beveled at its edges. In order to be able to scarf the beveled surfaces 19 and 20 with as nearly the same scarfing depth as possible (although in this area the distance between torch and surface is greater than at the middle of the ingot), the oxidizing gas pressure must be increased. The oxidizing gas conduit 9 for each head 1 is equipped in this case with two parallel valves 21 and 22. Valve 21 allows the amount of oxygen necessary for normal use to pass through, while valve 22 allows considerably larger amounts through. For scarfing the beveled surfaces 19 and 20, valve 22 is thus opened.

Valve 22 is also opened if deeper surface flaws 23, such as cracks, indentations or the like, are to be removed at the same speed (as shown in FIG. 7).

The above-described scarfing torches represent only some possible designs according to the invention, whereby the invention is in no way limited to these examples. Moreover other designs and arrangements in the torches can be realized without leaving the scope of the invention. For powder scarfing an additional nozzle head with respective channels for the supply of powder and valves for controlling the powder flow can be mounted on each head 2 and 6, such as indicated by conduit 90 and valve 110 in FIG. 2.

What is claimed is:

1. A scarfing torch including a number of scarfing heads disposed side by side for the thermochemical scarfing of a first surface of a work piece, means for feeding an oxidizing gas through each of said heads, said means including a wide flat discharge passage in each of said heads for discharging a sheet-like stream of the oxidizing gas, a plurality of fuel gas and preheat passages in said heads terminating in at least one row of orifices adjacent the sheet-like stream formed by the flat discharge passage in each of said heads, separate adjusting means in each of said heads for controlling the flow of gas through said passages, means for opening and closing said adjusting means in at least one of said heads independently of the other of said heads, and control means for selectively opening and closing the passages in the outer of said side by side heads.

2. A torch as set forth in claim 1 including auxiliary powder passageways terminating in a row of orifices adjacent to the oxidizing gas passage, powder adjusting means for controlling the flow of said powder in each scarfing head, further means for independently closing and opening said powder adjusting means of at least one scarfing head, and powder control means for selectively closing and opening the passages for said powder in at least one of the outer scarfing heads.

3. A torch as set forth in claim 2 including pressure means for independently controlling the gas pressure of the oxidizing gas in each scarfing head.

4. A torch as set forth in claim 3, wherein a first valve is in each oxidizing gas passage of each scarfing head for permitting a normal rate of flow therethrough and a second valve being in each oxidizing passage arranged parallel to the first valve for permitting an increased rate of flow therethrough.

5. A torch as set forth in claim 2 wherein at least one auxiliary scarfing head is connected for scarfing a second surface of the work piece simultaneously with scarfing of said first surface by said side by side heads, each of said at least one auxiliary scarfing head including gas and powder passageways, and auxiliary control means for selectively opening and closing said passageways in the outer of said at least one auxiliary scarfing head.

6. A torch as set forth in claim 1 including pressure means for independently controlling the gas pressure of the oxidizing gas in each scarfing head.

7. A torch as set forth in claim 6 wherein a first valve is in each oxidizing gas passage of each scarfing head for permitting a normal rate of flow therethrough and a second valve being in each oxidizing passage arranged parallel to the first valve for permitting an increased rate of flow therethrough.

8. A torch as set forth in claim 1 wherein at least one auxiliary scarfing head is connected for scarfing a second surface of the work piece simultaneously with scarfing of said first surface by said side by side heads, each of said at least one auxiliary scarfing head including gas and powder passageways, and auxiliary control means for selectively opening and closing said passageways in the outer of said at least one auxiliary scarfing head.

References Cited

UNITED STATES PATENTS

| | | | |
|---|---|---|---|
| 2,622,048 | 12/1952 | Moesinger | 110—22 X |
| 3,016,947 | 1/1962 | Allan | 158—27.4 |
| 3,230,117 | 1/1966 | Buddenhagen | 148—9.5 |

CHARLES J. MYHRE, *Primary Examiner.*